United States Patent
Cypher et al.

(10) Patent No.: US 7,797,491 B2
(45) Date of Patent: *Sep. 14, 2010

(54) FACILITATING LOAD REORDERING THROUGH CACHELINE MARKING

(75) Inventors: Robert E. Cypher, Saratoga, CA (US); Shailender Chaudhry, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 803 days.

This patent is subject to a terminal disclaimer.

(21) Appl. No.: 11/591,225

(22) Filed: Oct. 31, 2006

(65) Prior Publication Data
US 2008/0104335 A1 May 1, 2008

(51) Int. Cl.
*G06F 12/00* (2006.01)
*G06F 13/00* (2006.01)
(52) U.S. Cl. ...................... 711/118; 711/113
(58) Field of Classification Search ........... 711/113, 711/E12.02, E12.039
See application file for complete search history.

(56) References Cited

U.S. PATENT DOCUMENTS

| | | | | |
|---|---|---|---|---|
| 5,577,200 A | * | 11/1996 | Abramson et al. | 714/50 |
| 5,761,712 A | * | 6/1998 | Tran et al. | 711/126 |
| 7,389,383 B2 | * | 6/2008 | Tremblay et al. | 711/118 |
| 2004/0162951 A1 | * | 8/2004 | Jacobson et al. | 711/143 |
| 2004/0162967 A1 | * | 8/2004 | Tremblay et al. | 712/228 |
| 2004/0187123 A1 | * | 9/2004 | Tremblay et al. | 718/100 |
| 2005/0262301 A1 | * | 11/2005 | Jacobson et al. | 711/118 |

* cited by examiner

*Primary Examiner*—Mardochee Chery
(74) *Attorney, Agent, or Firm*—Park, Vaughan & Fleming LLP

(57) ABSTRACT

One embodiment of the present invention provides a system that facilitates load reordering through cacheline marking. During operation, the system receives a load operation to be executed. Next, the system determines whether a cacheline for the load has been load-marked by a thread which is performing the load. If so, the system performs the load. Otherwise, the system obtains the cacheline and subsequently attempts to load-mark the cacheline. If the cacheline is successfully load-marked, the system performs the load.

28 Claims, 6 Drawing Sheets

FACILITATING LOAD REORDERING THROUGH CACHELINE MARKING

RELATED APPLICATION

The subject matter of this application is related to the subject matter in a co-pending non-provisional application by the same inventors as the instant application entitled, "Facilitating Store Reordering through Cacheline Marking" having Ser. No. 11/591,223, and filing date Oct. 31, 2006.

BACKGROUND

1. Field of the Invention

The present invention relates to the design of processors within computer systems. More specifically, the present invention relates to a technique that facilitates reordering loads through cacheline marking.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

Efficient caching schemes can help to reduce the number of accesses to memory. However, when a memory operation, such as a load, generates a cache miss, the subsequent access to level-two (L2) cache or memory can require dozens or hundreds of clock cycles to complete, during which time the processor is typically idle, performing no useful work.

One way to mitigate this problem is to speculatively execute subsequent instructions (including loads) during cache misses. Specifically, the processor does not wait for loads that generate cache misses to complete, but instead speculatively performs subsequent loads. Consequently, a large number of loads can be speculatively performed out of program order. Eventually, the processor completes the earlier loads, and if the speculative execution is successful, commits the speculative loads to the architectural state of the processor.

Some existing speculative-execution techniques use dedicated hardware structures to maintain the addresses of speculative loads while snooping invalidations to detect if any of the speculatively-loaded cachelines is invalidated. These existing techniques "fail" a speculative load if such an invalidation is detected. Unfortunately, these existing techniques require dedicated hardware resources that do not scale well for a large number of speculative loads.

Another existing technique uses metadata in the L1 data cache to indicate if a thread has speculatively loaded the cacheline. (See U.S. Pat. No. 7,089,374, entitled, "Selectively Unmarking Load-Marked Cache Lines during Transactional Program Execution," by inventors Marc Tremblay and Shailender Chaudhry.) This technique "fails" a speculative load if the corresponding speculatively-loaded cacheline is invalidated or replaced from the L1 data cache. However, such invalidations and replacements occur more frequently than common coherence conflicts, and consequently cause a significant number of failed speculative loads. Note that failed speculative loads can consume memory bandwidth and can thereby reduce the performance of non-speculative loads.

Hence, what is needed is a method and apparatus that facilitates reordering loads, such as speculative loads, without the above-described performance problems.

SUMMARY

One embodiment of the present invention provides a system that facilitates load reordering through cacheline marking. During operation, the system receives a load operation to be executed. Next, the system determines whether a cacheline for the load has been load-marked by a thread which is performing the load. If so, the system performs the load. Otherwise, the system obtains the cacheline and subsequently attempts to load-mark the cacheline. If the cacheline is successfully load-marked, the system performs the load.

In a variation on this embodiment, the system determines whether the cacheline for the load has been load-marked by checking a private buffer associated with the thread.

In a variation on this embodiment, the system determines whether the cacheline for the load has been load-marked by checking the load-mark on the cacheline to determine if it has been set by the thread.

In a further variation on this embodiment, the private buffer for the thread maintains the addresses of the cachelines whose load-marks have been set by the thread.

In a further variation, the system checks the private buffer for the thread to see if the address of the cacheline exists in the private buffer.

In a variation on this embodiment, the load-mark for the cacheline includes a load counter which keeps a count of how many threads hold load-marks on the cacheline.

In a further variation on this embodiment, the system load-marks the cacheline by: reading the load counter value from the cacheline; incrementing the load counter value; storing the incremented load counter value to the cacheline; and adding a corresponding entry to the private buffer for the thread which includes the address of the cacheline.

In a further variation on this embodiment, the system removes the load-mark from the cacheline. The system subsequently removes the address of the cacheline from the private buffer.

In a further variation, the system removes the load-mark from the cacheline by: reading the load counter value from the cacheline; decrementing the load counter value; and storing the decremented load counter value to the cacheline.

In a variation on this embodiment, the system attempts to load-mark the cacheline. During operation, the system determines if the cacheline has been store-marked by the thread. If so, the system load-marks the cacheline. Otherwise, the system determines if the cacheline has been store-marked by another thread. If so, the system does not load-mark the cacheline. Otherwise, the system load-marks the cacheline.

In a further variation on this embodiment, the system determines if the cacheline has been store-marked by the thread by checking a store-mark buffer which maintains addresses of cachelines whose store-marks have been set by the thread to see if the address of the cacheline exists in the store-mark buffer.

In a further variation, the system determines if the cacheline has been store-marked by another thread by: checking a store-mark in a copy of the cacheline in a local cache to see if the store-mark has been set; and, if there is no valid copy of the cacheline in the local cache, using a cache-coherency mechanism to determine if the store-mark has been set in a copy of the cacheline in another cache or in memory.

In a further variation, using the cache-coherence mechanism involves: sending a cache-coherence signal to other caches and/or the memory to determine whether a copy of the cacheline has been store-marked by another thread; and receiving a NACK signal if another copy of the cacheline has been store-marked by another thread.

In a variation on this embodiment, if the thread has load-marked the cacheline, no other thread can store to the cacheline.

In a variation on this embodiment, if the thread has load-marked the cacheline, no other thread can store-mark the cacheline.

In a variation on this embodiment, the system receives a set of loads directed to a set of cachelines which are load-marked by the thread. Next, the system reorders the set of loads into a new order. The system then performs the set of loads in the new order.

In a further variation on this embodiment, the set of loads that are performed in the new order appear to other threads to have been performed in program order.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

One embodiment of the present invention provides a memory system which facilitates performing load operations out of program order. To accomplish this without violating a conventional memory model such as Sequential Consistency (SC) or Total-Store-Order (TSO), the present invention adds a load-mark to each cacheline, wherein the load-mark can be propagated to all levels of the memory hierarchy, including all caches and main memory. In addition, each thread maintains a private buffer which keeps track of the addresses of all cachelines for which the thread has set the load-mark. When a particular cacheline is load-marked by a thread, the load-mark prevents store operations by another thread to the cacheline. Note that multiple threads can add load-marks to the same cacheline to facilitate load-sharing between these threads. This is accomplished by using a load counter for each cacheline to keep track of how many threads have placed load-marks on the cacheline. Furthermore, a load-mark can be used in conjunction with a store-mark for a cacheline. A detailed description of using a store-mark for a cacheline can be found in the related application, entitled, "Facilitating Store Reordering through Cacheline Marking" by the same inventors as the instant application, having Ser. No. 11/591, 223, and filing date Oct. 31, 2006.This related application is incorporated by reference herein.

Computer System

Figure 1:
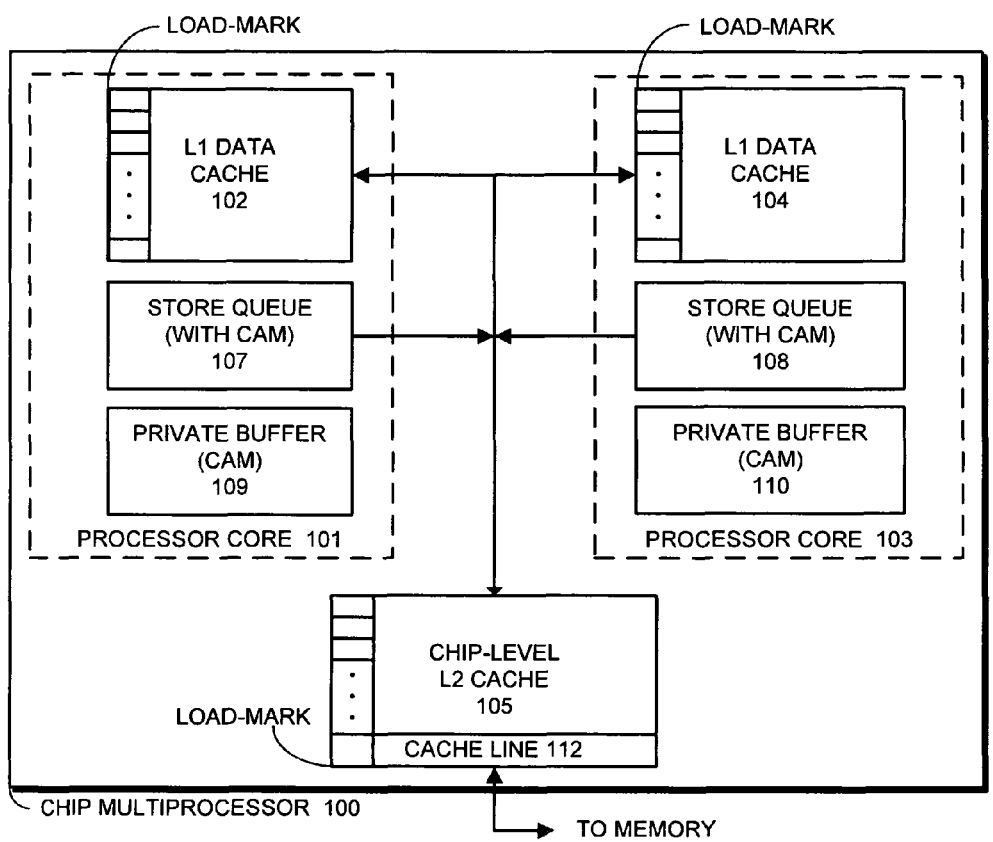
FIG. 1 illustrates an exemplary Chip Multi-Processor (CMP) system in accordance with an embodiment of the present invention.

FIG. 1 illustrates an exemplary Chip Multi-Processor (CMP) system 100 in accordance with an embodiment of the present invention. CMP system 100 is incorporated onto a single semiconductor die, and includes two processor cores, 101 and 103.

Processor cores 101 and 103 include L1 data caches 102 and 104, respectively, and they share L2 cache 105. Along with L1 data caches 102 and 104, processor cores 101 and 103 include store queues 107 and 108, which buffer pending store operations.

During a store operation, processor core 101 first performs a lookup for a corresponding cacheline in L1 data cache 102. If the lookup generates a miss in L1 data cache 102, processor core 101 creates an entry for the store in store queue 107 and sends a corresponding fetch for the store to L2 cache 105.

During a subsequent load operation, processor core 101 uses a CAM structure to perform a lookup in store queue 107 to locate completed but not-yet-retired stores to the same address that are logically earlier in program order. If such a matching store exists, the load operation obtains its value from store queue 107 rather than from the memory subsystem.

Note that copies of cachelines in data caches 102-105 and in the memory (not shown) can include a load-mark. This load-mark can be used to prevent conflicting memory references from taking place. In conjunction with the load-mark, processor cores 101 and 103 additionally include private buffers 109 and 110, which maintain copies of addresses of load-marked cachelines to facilitate efficient lookups of theses addresses. We discuss how the load-mark is used in more detail below.

Performing Memory Operations to a Cacheline Containing a Load-Mark

One embodiment of the present invention places a "load-mark" on certain cachelines in all levels of the memory hierarchy, including all caches (L1 caches 102 and 104, L2 cache 105 in FIG. 1) and main memory. We will refer to the process of placing a load-mark on a cacheline as "load-marking" the cacheline.

Note that multiple threads can hold load-marks on the same cacheline. This is accomplished by including a load counter in each cacheline to keep a count of how many threads hold load-marks on the cacheline. This differs from the usage of a store-mark in the above-referenced related patent application because the store-mark ensures exclusive access to the cacheline.

In one embodiment of the present invention, each thread maintains a private buffer containing addresses for cachelines which have been load-marked by the thread. Hence, whenever a thread needs to load from a cacheline, that thread first checks its private buffer to see if it has already set the load-mark for the cacheline.

In one embodiment of the present invention, this private buffer can be implemented as an SRAM-based CAM. (For a detailed description of an SRAM-based CAM, see U.S. patent application Ser. No. 11/495,852 entitled, "Content-Addressable Memory that Supports a Priority Ordering between Banks," by inventor Robert E. Cypher.) Furthermore, if load-marking of cachelines is performed in conjunction with the store-marking, the private buffer for load-marks can be the same private buffer that keeps track of the store-marks.

Figure 2:
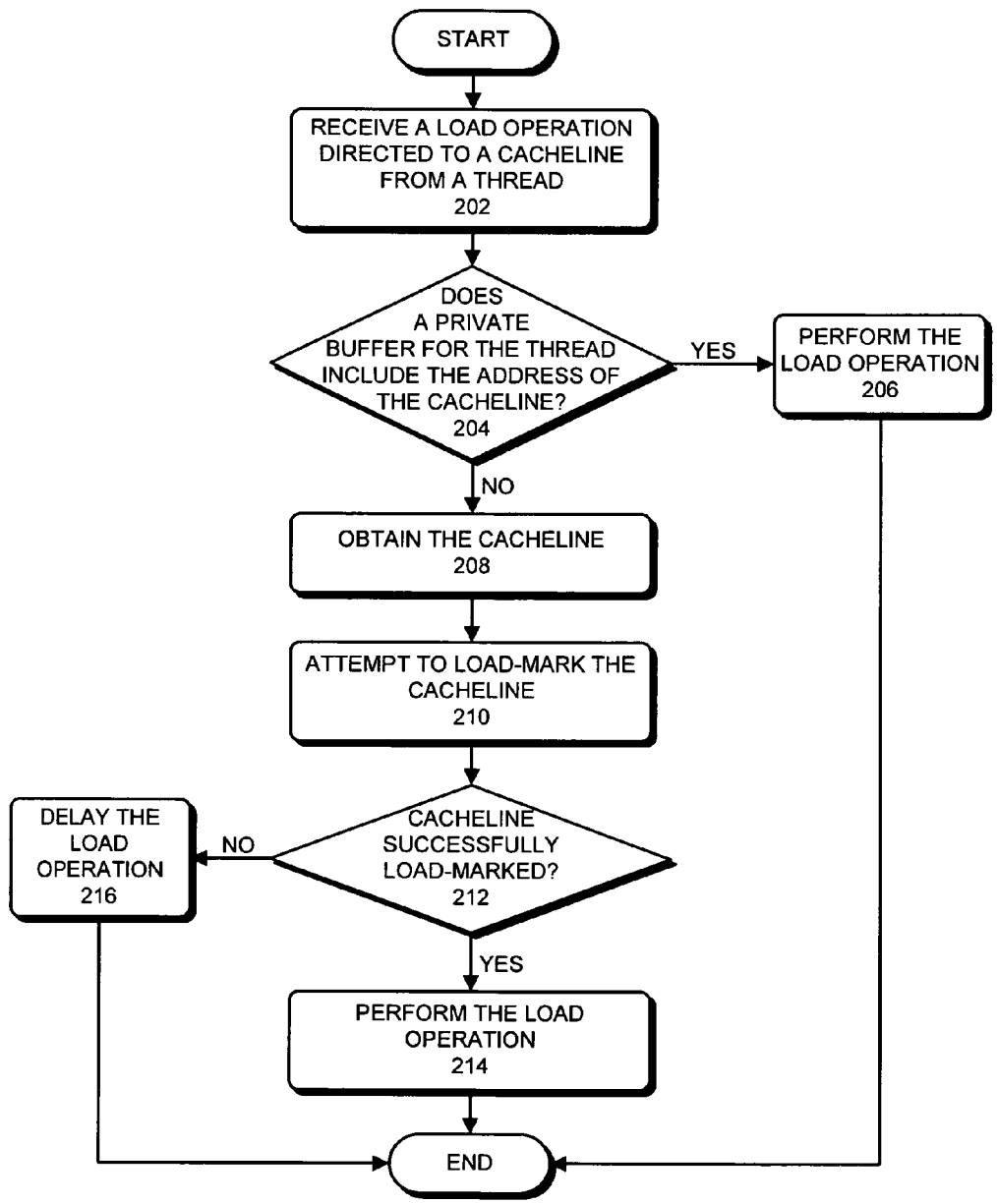
FIG. 2 presents a flowchart illustrating the process of performing a load operation in accordance with an embodiment of the present invention.

FIG. 2 presents a flowchart illustrating the process of performing a load operation in accordance with an embodiment of the present invention.

The system first receives a load operation from a thread which is directed to a cacheline (step 202).

Next, the system checks a private buffer associated with the thread, which stores addresses for load-marked cachelines, to determine whether a load-mark for the cacheline has been set by the thread (step 204). Specifically, the system performs a lookup in the thread's private buffer based on the address of the load operation to locate a matching address for a load-marked cacheline. Note that the private buffer can be structured as a CAM to facilitate lookups based on addresses.

If the private buffer contains a matching address, the thread knows that it has already set the load-mark in the cacheline, and can proceed with the load operation without changing the status of the load-mark in the cacheline (step 206).

If, however, the private buffer does not contain a matching address, the system concludes that the thread has not set the load-mark. The system then obtains the cacheline (step 208) and subsequently attempts to load-mark the cacheline (step 210). Next, the system determines if load-marking was successful (step 212). If so, the system performs the load operation (step 214). Otherwise, the system delays the load operation, so that the load operation has to be retried (step 216).

Figure 3:
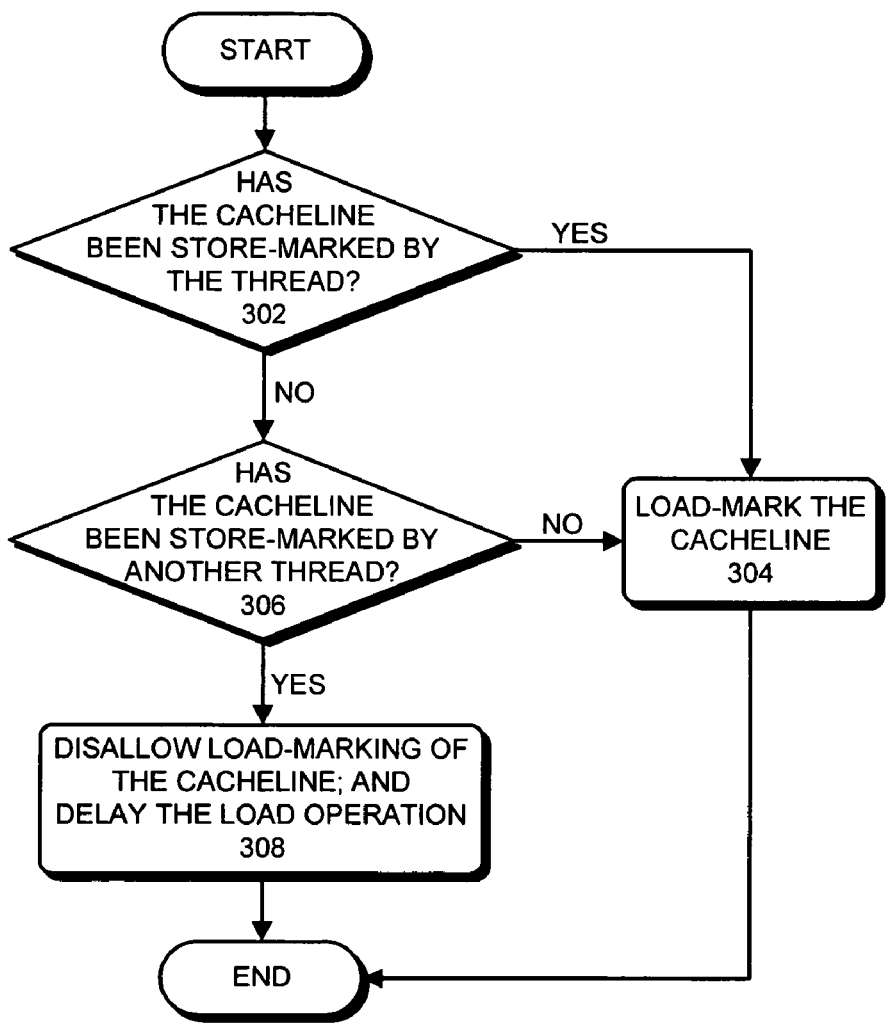
FIG. 3 presents a flowchart illustrating the process of attempting to load-mark a cacheline in accordance with an embodiment of the present invention.

FIG. 3 presents a flowchart illustrating the process of attempting to load-mark the cacheline in accordance with an embodiment of the present invention.

The system first determines if the cacheline has been store-marked by the thread (step 302). Specifically, the system checks a store-mark buffer which maintains addresses of cachelines store-marked by the thread to see if the address of the cacheline exists in the store-mark buffer. As mentioned previously, this store-mark buffer can be implemented using the same structure as the private buffer for the load-marks. In one embodiment of the present invention, the store-mark buffer and the private buffer for the load-marks are implemented as a single buffer. This embodiment requires the lookup mechanism to distinguish an address as being associated with a load-mark or a store-mark.

If the system determines that the cacheline has been store-marked by the thread, the system knows that no other thread can load-mark the same cacheline. The system then load-marks the cacheline (step 304). Note that when a thread has both load-marked and store-marked a same cacheline, no other thread can load-mark the cacheline because of the exclusive property of store-marks.

If, however, the system determines that the cacheline has not been store-marked by the thread, the system next determines if the cacheline has been store-marked by another thread (step 306). If so, the cacheline is store-marked by the other thread. As a result, the thread cannot load-mark the cacheline and the load operation is delayed (step 308). Otherwise, the system knows that the cacheline is not store-marked by any thread, and the system proceeds to load-mark the cacheline for the thread (step 304).

Figure 4:
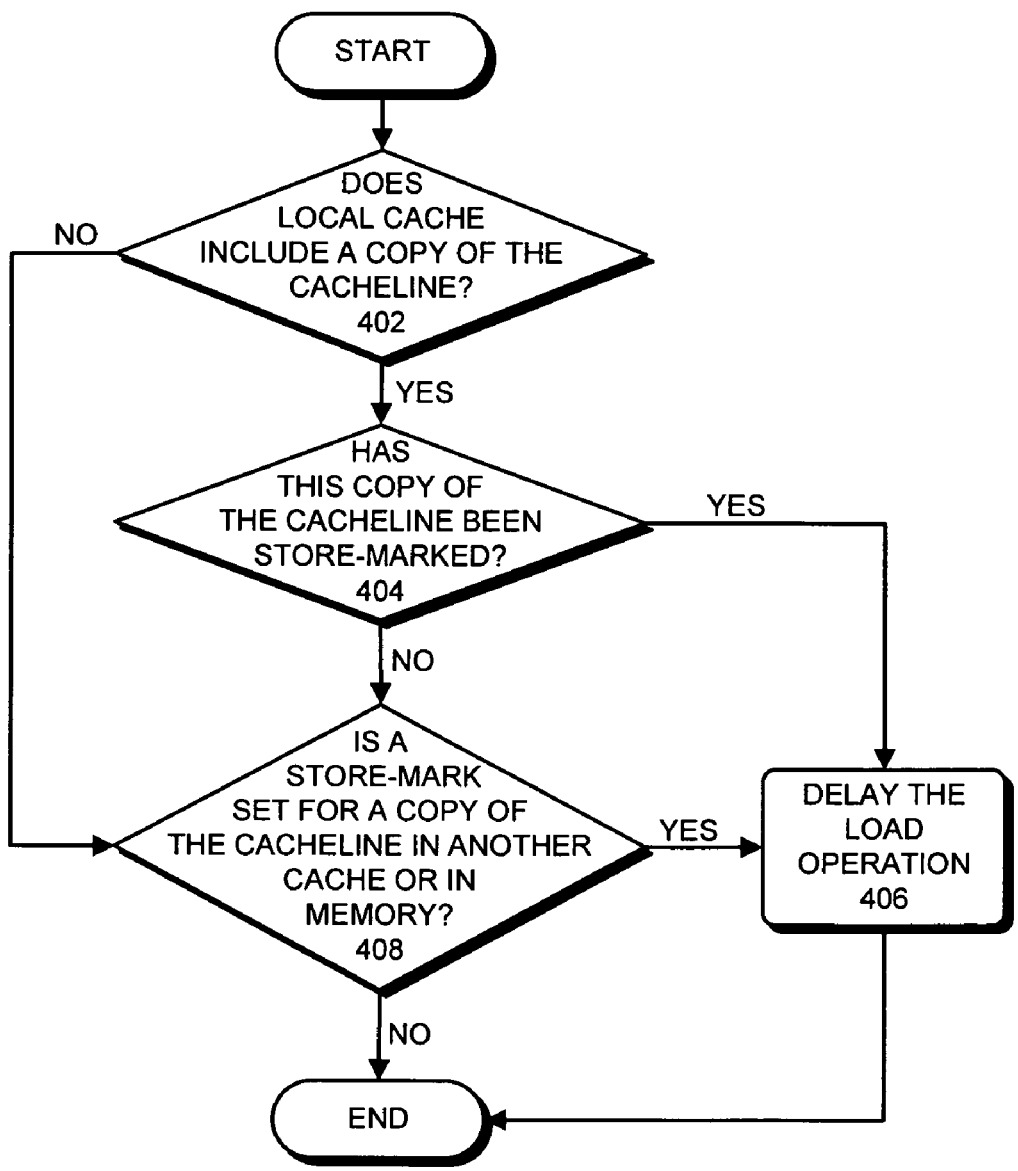
FIG. 4 presents a flowchart illustrating the process of determining whether the cacheline has been store-marked by another thread in accordance with an embodiment of the present invention.

FIG. 4 presents a flowchart illustrating the process of determining whether the cacheline has been store-marked by another thread in accordance with an embodiment of the present invention. During this process, the thread first checks in its local cache for a copy of the cacheline (step 402). If the thread finds a copy of the cacheline, it examines the store-mark in the copy of the cacheline to determine whether the cacheline has been store-marked by another thread (step 404). If so, the cacheline cannot be load-marked, and the load operation is delayed (step 406).

On the other hand, if there is no valid copy of the cacheline in the local cache, the system determines whether the store-mark has been set in another copy of the cacheline which exists in another cache or in memory (step 408). If so, the cacheline has been store-marked by another thread, which means the cacheline cannot be load-marked, and the load operation is delayed (step 406).

Note that in step 408, the system can use a cache-coherence mechanism to determine whether another cache or the memory holds a store-marked copy of the cacheline. This can involve sending an exclusive access request for the cacheline to the other caches. If the cacheline has been store-marked in another cache, the system will receive a NACK signal from the other cache which causes the request to fail, in which case the memory operation can be retried. If, however, the system does not receive a NACK signal and if there is no valid copy of the cacheline in memory which contains a store-mark, it can conclude that the cacheline has not been store-marked by another thread.

Referring back to step 206 of FIG. 2, note that in order to perform the load operation, it may be necessary to use the cache coherence protocol to obtain a copy of the cacheline in a suitable state in the local cache. Specifically, it may be necessary to obtain a copy of the cacheline in the shared (S), exclusive (E), owned (O), or modified (M) state.

Note that although we have described using both load-marks and store-marks, load-marks can generally be used without having to also use store-marks.

Figure 5:
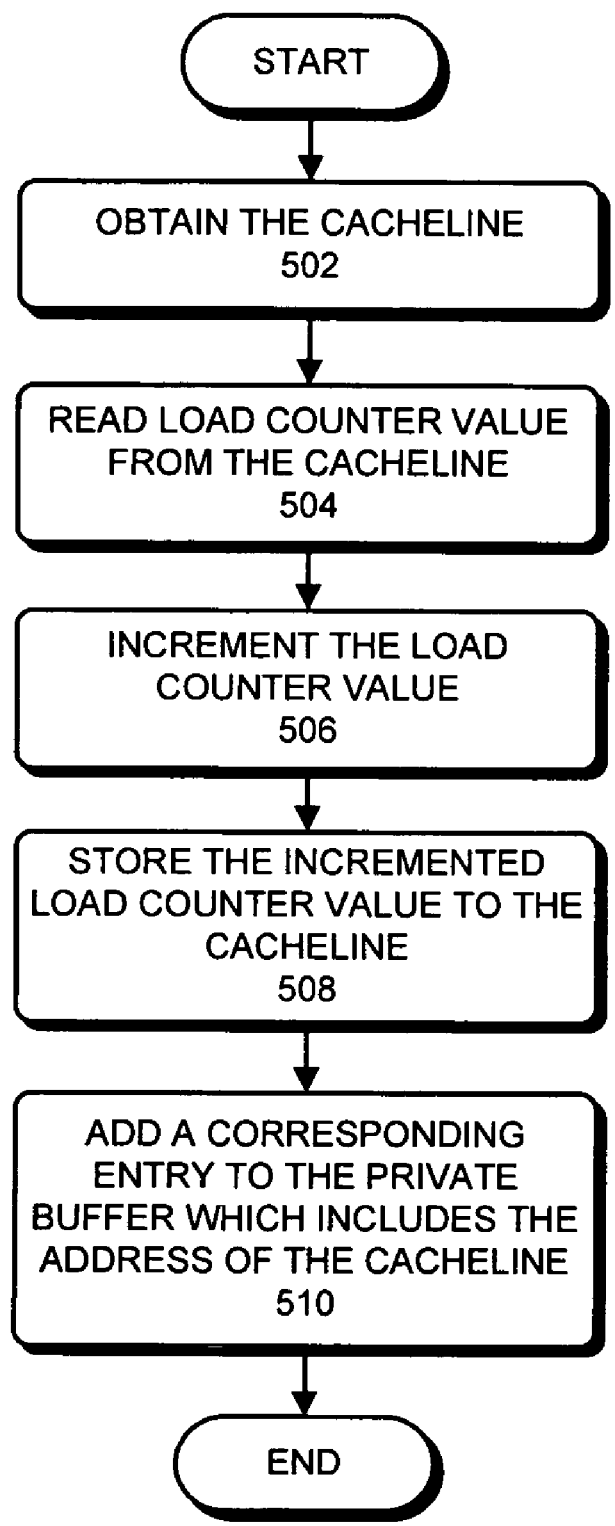
FIG. 5 presents a flowchart illustrating the process of load-marking a cacheline in accordance with an embodiment of the present invention.

FIG. 5 presents a flowchart illustrating the process of load-marking a cacheline in accordance with an embodiment of the present invention.

The system first obtains the cacheline (step 502). Next, the system reads the load counter value from the cacheline (step 504). The system then increments the load counter value (step 506), and subsequently stores the incremented load counter value back to the cacheline (step 508). Finally, the system adds a corresponding entry to the private buffer for the thread which includes the address of the cacheline (step 510). Note that this entry will remain in the private buffer until subsequent changes are made to the state of the cacheline, such as removing the load-mark.

In one embodiment of the present invention, when a thread either commits or fails (that is, the thread determines that it will never commit) a set of loads that are directed to a cacheline which was load-marked by the thread, the system removes the load-mark from the cacheline by decrementing the load counter value in the cacheline, and additionally removing the address of the cacheline from its private buffer.

Figure 6:
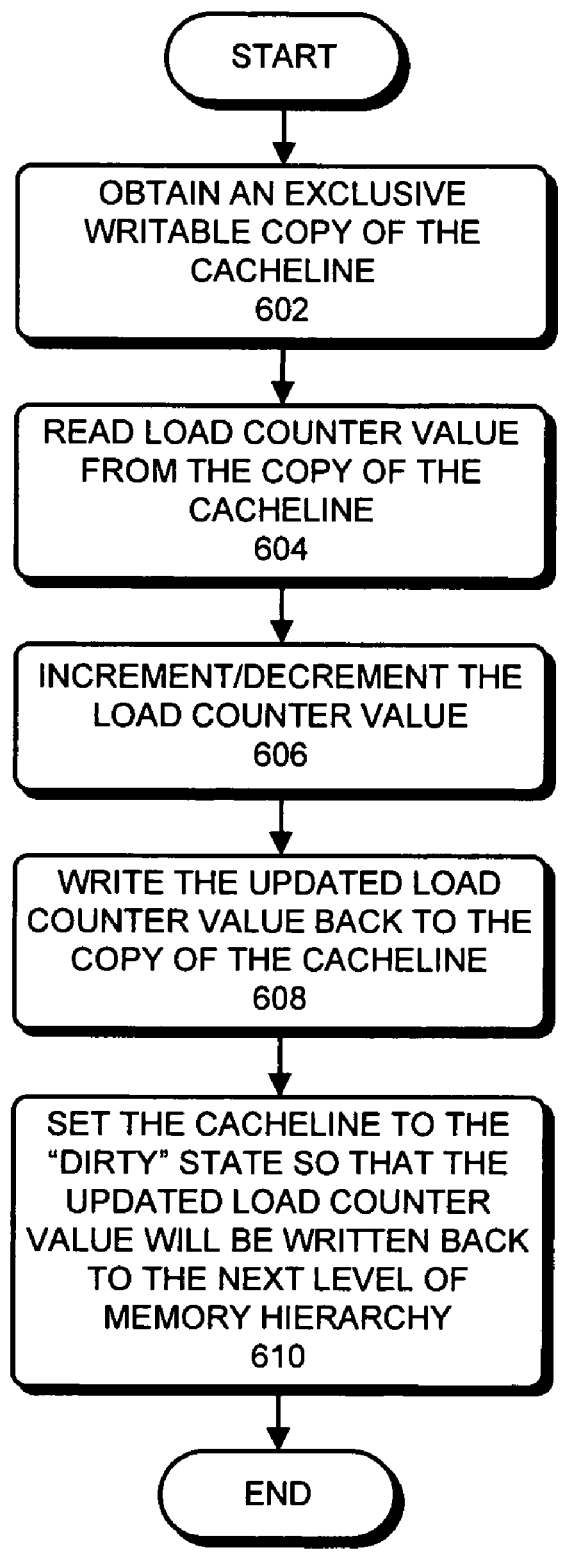
FIG. 6 presents a flowchart illustrating the process of propagating the load-mark in accordance with an embodiment of the present invention.

Note that it is desirable to propagate the load-marks which have been updated to guarantee that each valid copy of a specific cacheline maintains the same number of load-marks everywhere in the memory hierarchy. FIG. 6 presents a flowchart illustrating a process of propagating the load-mark in accordance with an embodiment of the present invention.

To update a load-mark on a cacheline, the system first obtains an exclusive writable copy of the cacheline (step 602). Next, the system reads the load counter value from the copy of the cacheline (step 604). The system then increments or decrements the load count (step 606) and writes the updated load counter value back to the copy of the cacheline (step 608). Next, the system sets the cacheline to the "dirty" (modified) state, so that when it is replaced from the cache it will be written back to the next level of the memory hierarchy with the new counter value (step 610).

Note that when a thread tries to store to a cacheline which contains a load-mark, the thread first uses a cache-coherence protocol to obtain write access to the cacheline. More specifically, the thread first checks the load counter in the cacheline. If there are no load marks, i.e., the load counter equals zero, the store can proceed. If there is exactly one load mark and this thread has set the load-mark (which can be determined by checking the thread's private buffer of cacheline addresses it has load-marked), the store can proceed. In other cases, where at least one other thread has load-marked the cacheline, the store is prevented and must be retried.

Also note that when load-marking is used in conjunction with store-marking, a store-mark can be set whenever the thread has the right to store to the cacheline as described above.

While the above description focuses on using a private buffer to keep track of the cachelines that are load-marked by the thread, it is possible to not use a private buffer to determine if the current thread has a load-mark on the cacheline. In one embodiment of the present invention, a load-mark on the cacheline can include the identity of the thread that sets the load-mark on the cacheline. In this embodiment, the system can simply check the load-mark on the cacheline to make this determination without consulting a private buffer.

Applications of Cacheline Load-Marking

Reordering Loads from a Load-Marked Cacheline

Once the load-mark has been set in a cacheline for a thread, the system can perform one or more loads by the thread to the cacheline. In particular, multiple loads to the same cacheline can occur out of program order while the load-mark is set. This is allowed because no other thread can store to the load-marked cacheline while the load-mark is set, which ensures that stores from other threads cannot interfere with values which are returned by out-of-order loads by the thread.

Reordering Loads from a set of Load-Marked Cachelines

Note that cacheline load-marking allows a set of loads to be applied to the memory hierarchy in any order, as long as all of the loads are directed to a set of cachelines which are load-marked at a single point in time. Because all of these cachelines are load-marked at the single point in time, they could have all been loaded at the single point in time, and in program order, from the perspective of other threads. This ensures that even if the loads are performed out of program order, the memory model (e.g. SC or TSO) is not violated. After performing the reordered loads, the system can then remove the load-marks from these cachelines in any order.

Note that by using both load-marks and store-marks, the system can perform both loads and stores out of program order.

Also note that it is possible for a thread to place load-marks on cachelines prior to performing certain loads and to not place load-marks on cachelines prior to performing other loads. For example, a thread may reorder some loads and not reorder other loads, in which case it may not place load-marks on some or all of the loads that it does not reorder.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating load reordering through cacheline marking, the method comprising:
   receiving a load to be executed;
   determining whether a cacheline for the load has been load-marked by a thread which is performing the load;
   if so, performing the load; and
   if not,
      obtaining the cacheline;
      attempting to load-mark the cacheline;
      if the cacheline is successfully load-marked, performing the load; and
      if the cacheline is not successfully load-marked, delaying the load.

2. The method of claim 1, wherein determining whether the cacheline for the load has been load-marked involves checking a private buffer associated with the thread.

3. The method of claim 1, wherein determining whether the cacheline for the load has been load-marked involves checking the load-mark on the cacheline to determine if it has been set by the thread.

4. The method of claim 2, wherein the private buffer for the thread maintains the addresses of the cachelines whose load-marks have been set by the thread.

5. The method of claim 4, wherein checking the private buffer for the thread involves checking the private buffer to see if the address of the cacheline exists in the private buffer.

6. The method of claim 1, wherein the load-mark for the cacheline includes a load counter which keeps a count of how many threads hold load-marks on the cacheline.

7. The method of claim 2, wherein load-marking the cacheline involves:
   reading a load counter value from the cacheline;
   incrementing the load counter value;
   storing the incremented load counter value to the cacheline; and
   adding a corresponding entry to the private buffer for the thread which includes the address of the cacheline.

8. The method of claim 2, wherein the method further comprises:
   removing the load-mark from the cacheline; and
   removing the address of the cacheline from the private buffer.

9. The method of claim 8, wherein removing the load-mark from the cacheline involves:
   reading a load counter value from the cacheline;
   decrementing the load counter value; and
   storing the decremented load counter value to the cacheline.

10. The method of claim 1, wherein attempting to load-mark the cacheline involves:
    determining if the cacheline has been store-marked by the thread;
    if so, load-marking the cacheline; and
    if not, determining if the cacheline has been store-marked by another thread;
       if so, not load-marking the cacheline; and
       if not, load-marking the cacheline.

11. The method of claim 10, wherein determining if the cacheline has been store-marked by the thread involves checking a store-mark buffer, which maintains addresses of cachelines whose store-marks have been set by the thread, to see if the address of the cacheline exists in the store-mark buffer.

12. The method of claim 10, wherein determining if the cacheline has been store-marked by another thread involves:
   checking a store-mark in a copy of the cacheline in a local cache to see if the store-mark has been set; and
   if there is no valid copy of the cacheline in the local cache, using a cache-coherency mechanism to determine if the store-mark has been set in a copy of the cacheline in another cache or in memory.

13. The method of claim 12, wherein using the cache-coherence mechanism to determine if the store-mark has been set by another thread involves:
   sending a cache-coherence signal to other caches and/or the memory to determine whether a copy of the cacheline has been store-marked by another thread; and
   if another copy of the cacheline has been store-marked by another thread, receiving a NACK signal.

14. The method of claim 1, wherein if the thread has load-marked the cacheline, no other thread can store to the cacheline.

15. The method of claim 1, wherein if the thread has load-marked the cacheline, no other thread can store-mark the cacheline.

16. The method of claim 1, wherein the method further comprises:
   receiving a set of loads directed to a set of cachelines which are load-marked by the thread;
   reordering the set of loads into a new order; and
   performing the set of loads in the new order.

17. The method of claim 16, wherein the set of loads that are performed in the new order appear to other threads to have been performed in program order.

18. An apparatus that facilitates load reordering through cacheline marking, comprising:
   a receiving mechanism configured to receive a load to be executed;
   a determination mechanism configured to determine whether a cacheline for the load has been load-marked by a thread which is performing the load;
   an execution mechanism configured to perform the load if the cacheline has been load-marked;
   a load-marking mechanism configured to load-mark the cacheline if the cacheline has not been load-marked;
   wherein if the cacheline has not been load-marked, the determination mechanism is configured to:
      obtain the cacheline; and to
      attempt to load-mark the cacheline; and
   wherein, if the cacheline is not successfully load-marked, the determination mechanism is configured to delay the load.

19. The apparatus of claim 18, wherein the determination mechanism is configured to check a private buffer associated with the thread.

20. The apparatus of claim 18, wherein the determination mechanism is configured to check the load-mark on the cacheline to determine if it has been set by the thread.

21. The apparatus of claim 19, wherein the private buffer for the thread maintains the addresses of the cachelines whose load-marks have been set by the thread.

22. The apparatus of claim 18, wherein the load-mark for the cacheline includes a load counter which keeps a count of how many threads hold load-marks on the cacheline.

23. The apparatus of claim 19, wherein the load-marking mechanism is configured to:
   read a load counter value from the cacheline;
   increment the load counter value;
   store the incremented load counter value to the cacheline; and to
   add a corresponding entry to the private buffer for the thread which includes the address of the cacheline.

24. The apparatus of claim 19, further comprising a removal mechanism configured to:
   remove the load-mark from the cacheline; and to
   remove the address of the cacheline from the private buffer.

25. The apparatus of claim 24, wherein the removal mechanism is further configured to:
   read a load counter value from the cacheline;
   decrement the load counter value; and to
   store the decremented load counter value to the cacheline.

26. The apparatus of claim 18, wherein while attempting to load-mark the cacheline, the determination mechanism is configured to:
   determine if the cacheline has been store-marked by the thread;
   if so, to load-mark the cacheline; and
   if not, to determine if the cacheline has been store-marked by another thread;
      if so, to not load-marking of the cacheline; and
      if not, to load-mark the cacheline.

27. The apparatus of claim 18, further comprising:
   a receiving mechanism configured to receive a set of loads directed to a set of cachelines which are load-marked by the thread;
   a reordering mechanism configured to reorder the set of loads into a new order; and
   wherein the execution mechanism is configured to perform the set of loads in the new order.

28. A computer system that facilitates load reordering through cacheline marking, comprising:
   a processor;
   a memory;
   a receiving mechanism configured to receive a load to be executed;
   a determination mechanism configured to determine whether a cacheline for the load has been load-marked by a thread which is performing the load;
   an execution mechanism configured to perform the load if the cacheline has been load-marked;
   a load-marking mechanism configured to load-mark the cacheline if the cacheline has not been load-marked;
   wherein if the cacheline has not been load-marked, the determination mechanism is configured to:
      obtain the cacheline; and to
      attempt to load-mark the cacheline; and
   wherein if the cacheline is not successfully load-marked, the determination mechanism is configured to delay the load.

* * * * *